United States Patent
Ueno et al.

(10) Patent No.: US 7,650,038 B2
(45) Date of Patent: Jan. 19, 2010

(54) IMAGE PROCESSING METHOD AND IMAGE PROCESSING APPARATUS

(75) Inventors: Akira Ueno, Akiruno (JP); Masaomi Tomizawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 727 days.

(21) Appl. No.: 11/352,432

(22) Filed: Feb. 10, 2006

(65) Prior Publication Data

US 2006/0182353 A1 Aug. 17, 2006

(30) Foreign Application Priority Data

Feb. 16, 2005 (JP) ............................. 2005-039559
Feb. 7, 2006 (JP) ............................. 2006-029823

(51) Int. Cl.
*G06K 9/36* (2006.01)
(52) U.S. Cl. ..................................... 382/232
(58) Field of Classification Search ......... 382/232–236, 382/238–252; 375/240.11, 240.19, 240.24–240.26, 375/E7.175–E7.19, E7.199–E7.22; 348/384.1, 348/390.1–421.1; 358/426.01–426.09
See application file for complete search history.

(56) References Cited

U.S. PATENT DOCUMENTS

| 6,298,166 | B1 * | 10/2001 | Ratnakar et al. ............. 382/248 |
| 6,608,933 | B1 * | 8/2003 | Dowell et al. ................ 382/232 |
| 6,664,902 | B2 * | 12/2003 | Andrew et al. ................ 341/50 |
| 6,933,970 | B2 * | 8/2005 | Koshiba et al. ............. 348/273 |
| 6,941,019 | B1 * | 9/2005 | Mitchell et al. ............. 382/232 |
| 7,146,053 | B1 * | 12/2006 | Rijavec et al. .............. 382/233 |

FOREIGN PATENT DOCUMENTS

JP 2000-312327 11/2000

* cited by examiner

*Primary Examiner*—Jose L Couso
(74) *Attorney, Agent, or Firm*—John C. Pokotylo; Straub & Pokotylo

(57) ABSTRACT

An image processing method includes inputting image data for one block line having pixels of N times of a minimum unit (MCU) of image compression in the direction of column, and the length in the direction of row equivalent to one length of a scanning line, and outputting sequentially the image data of each block by dividing the image data into a plurality of block, which consists of N units block arranged in the direction of column, each of the unit blocks consisting of M MCUs arranged in the direction of row. The output image data of each block is compressed from the upper side unit block of each block, and compressed image data for each block of one block line is obtained. The obtained compressed image data is written in the frame memory. The written compressed image data is changed in sequence.

41 Claims, 11 Drawing Sheets

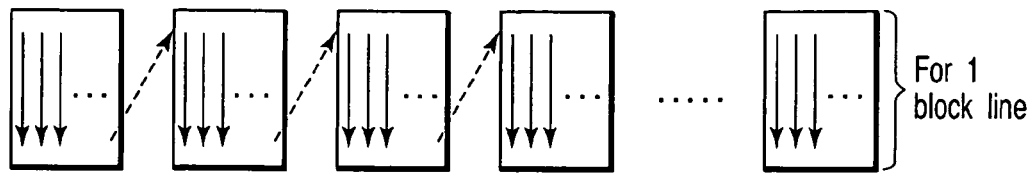
F I G. 3 A
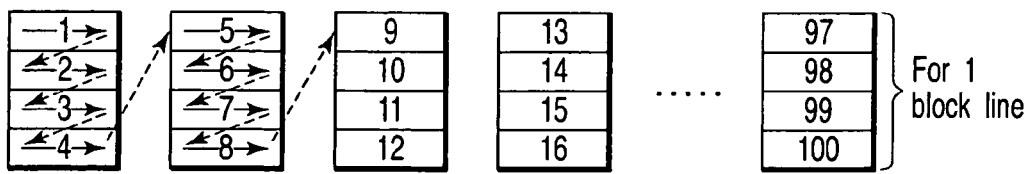
F I G. 3 B
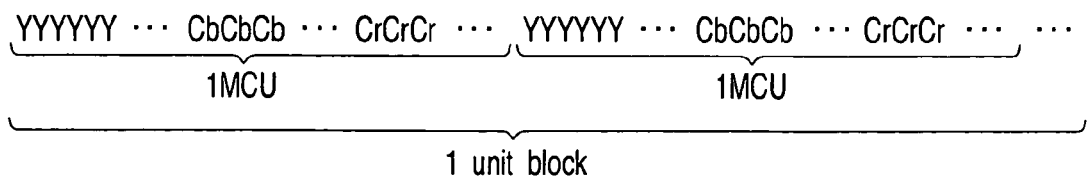
F I G. 4 A
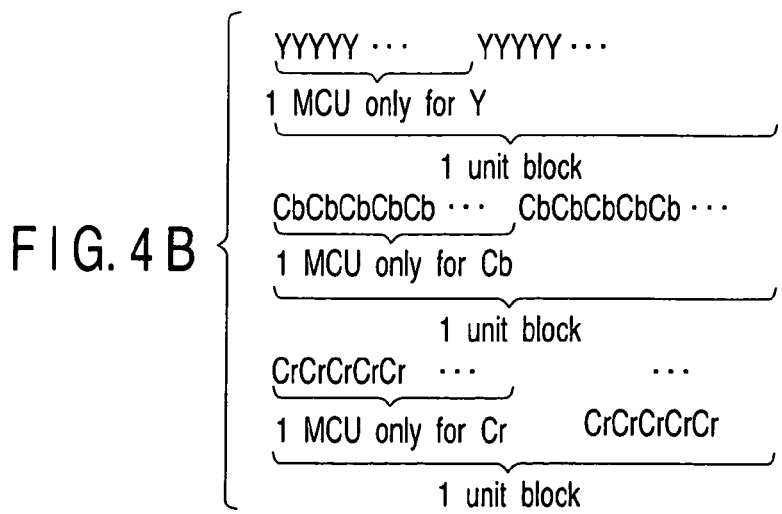
F I G. 4 B

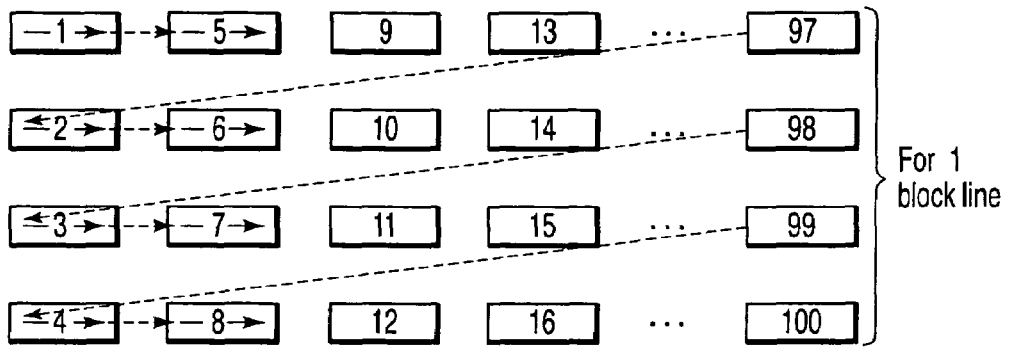
FIG. 7
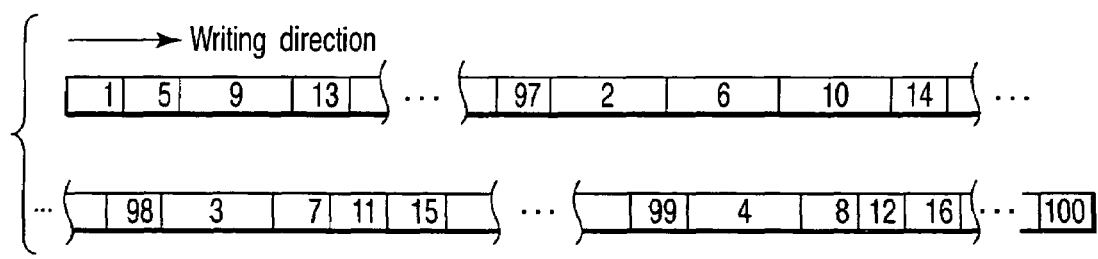
FIG. 8A
FIG. 8B

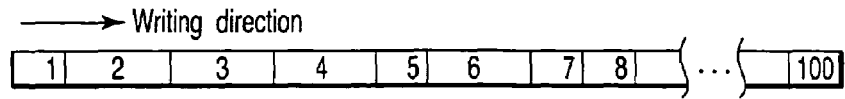
FIG. 11A
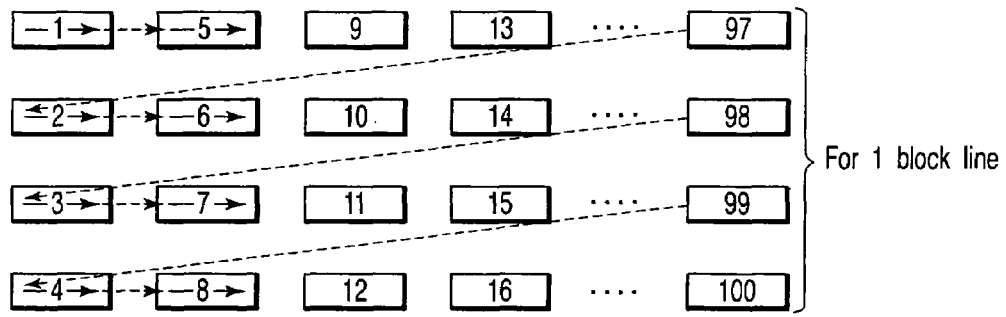
FIG. 11B
FIG. 12
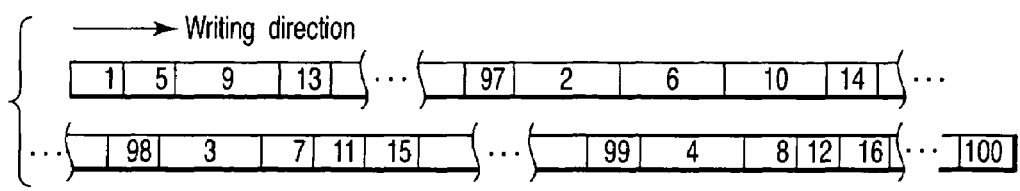
FIG. 13A
FIG. 13B

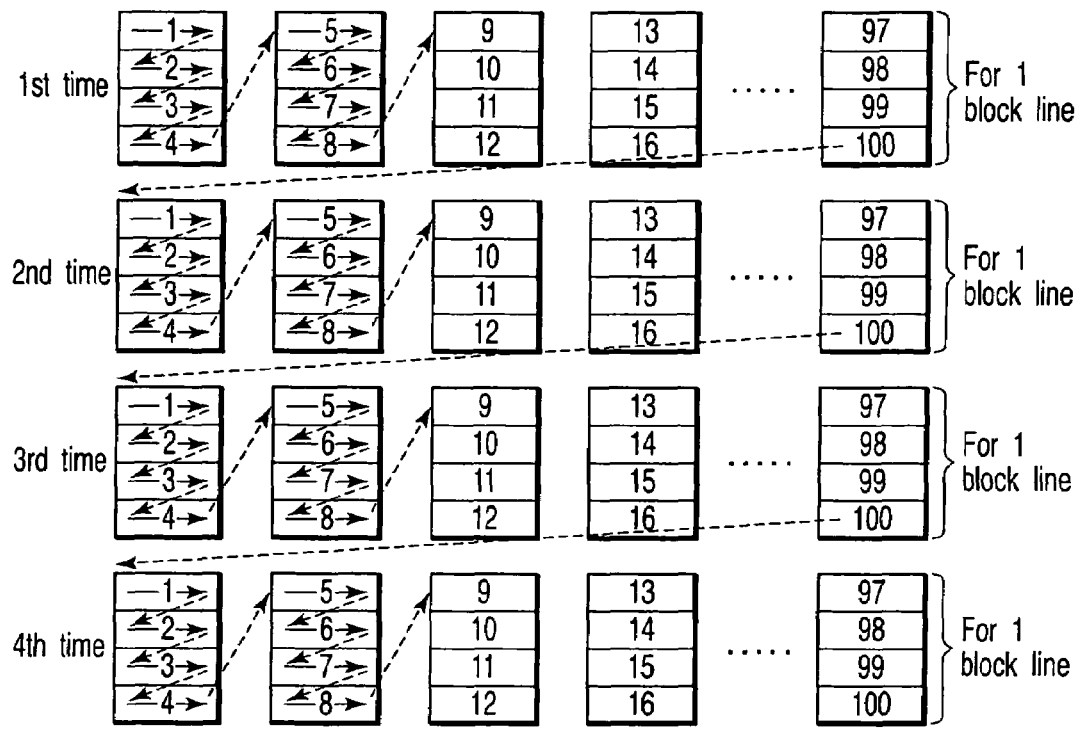
F I G. 17
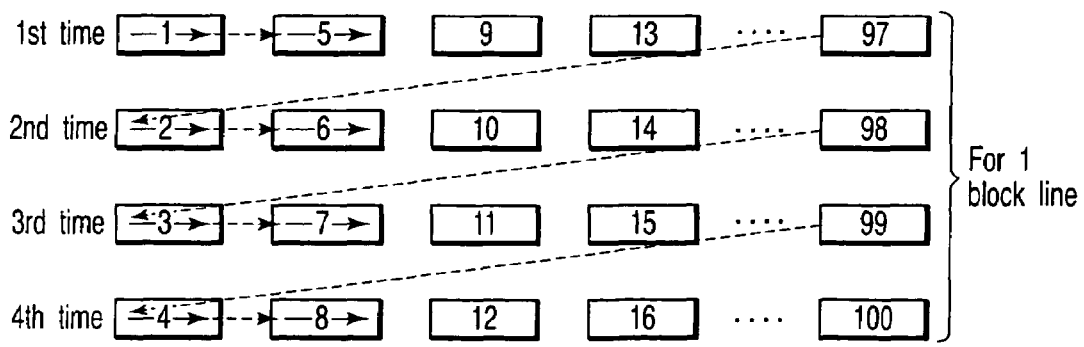
F I G. 18

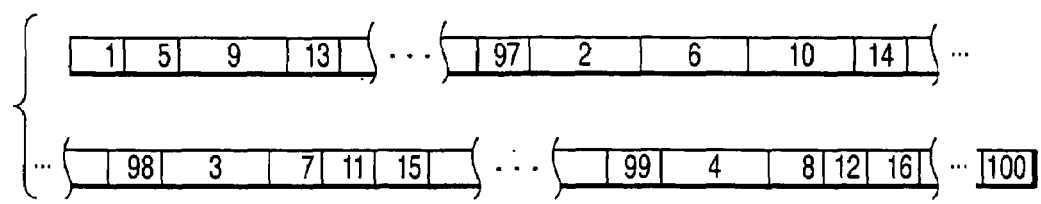
FIG. 19A
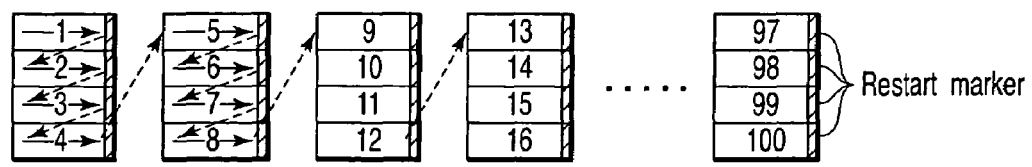
FIG. 19B
FIG. 20

IMAGE PROCESSING METHOD AND IMAGE PROCESSING APPARATUS

CROSS-REFERENCE TO RELATED APPLICATIONS

This application is based upon and claims the benefit of priority from prior Japanese Patent Applications No. 2005-039559, filed Feb. 16, 2005; and No. 2006-029823, filed Feb. 7, 2006, the entire contents of both of which are incorporated herein by reference.

BACKGROUND OF THE INVENTION

1. Field of the Invention

The present invention relates to an image processing method and image processing apparatus suitable for a digital camera, and more particularly an image processing method and image processing apparatus suitable for JPEG processing in a digital camera.

2. Description of the Related Art

Jpn. Pat. Appln. KOKAI Publication No. 2000-312327 proposes an image processing apparatus, which can perform several spatial image processing, such as low-pass filtering (LPF) to eliminate high frequency components of image data before resizing image data, and resizing to magnify/reduce image data, and subsequent JPEG compression, as a directly connected process without writing the processing data in a frame memory. Concretely, several image processors are directly connected through a small capacity memory, and image data is input as a unit of block having a certain number of data in the direction of column, when data is input from a frame memory to an image processing unit.

Further, according to the method of the above Publication No. 2000-312327, for directly connecting image processors with a JPEG processor, and two buffer memories (double buffer) are provided between the image processors and JPEG processor, and the image data output from the image processors is input by the double buffer in the sequence suitable for JPEG processing, or for each Minimum Coded Unit (MCU).

BRIEF SUMMARY OF THE INVENTION

According to a first aspect of the present invention, there is provided an image processing method for spatially processing image data picked up and stored in a frame memory in an image processing unit, compressing the obtained image data in an image compression unit connected in series with the image processing unit, and outputting the obtained compressed image data, comprising:

inputting the image data obtained from the image processing unit sequentially for one block line having pixels of N times of a minimum unit of the image compression in the direction of column, and the length in the direction of row equivalent to one length of a scanning line, and outputting sequentially the image data of each block by dividing the image data into a plurality of block, which consists of N unit blocks arranged in the direction of column, each of the unit blocks consisting of M minimum units of the image compression arranged in the direction of row;

compressing the sequentially output image data of each block sequentially from the upper side unit block of each block, and obtaining compressed image data for each block of one block line;

writing the obtained compressed image data for each block of one block line in the frame memory; and changing the sequence of the written compressed image data for each block of one block line.

According to a second aspect of the present invention, there is provided an image processing apparatus for spatially processing image data picked up and stored in a frame memory in an image processing unit, compressing the obtained image data in an image compression unit connected in series with the image processing unit, and outputting the obtained compressed image data, comprising:

a buffer memory which inputs the image data obtained from the image processing unit sequentially for one block line having pixels of N times of a minimum unit of the image compression in the direction of column, and the length in the direction of row equivalent to one length of a scanning line, and outputs sequentially the image data of each block by dividing the image data into a plurality of block, which consists of N unit blocks arranged in the direction of column, each of the unit blocks consisting of M minimum units of the image compression arranged in the direction of row;

a first image compression unit which obtains compressed image data for each block of one block line by compressing the image data of each block output sequentially from the buffer memory, sequentially from the upper side unit block of each block, and writes the obtained compressed image data for each block of one block line in the frame memory;

an image expansion unit which obtains expanded image data for each block of one block line by reading and expanding the compressed image data for each block of one block line written in the frame memory by the first image compression unit, and writes the obtained expanded image data for each block of one block line in the frame memory;

a sequence change data writing unit which writes the expanded image data for each block of one block line obtained in the image expansion unit, in the frame memory, so that the sequence of the expanded image data is changed; and a second image compression unit which reads the expanded image data for each block of one block line written in the frame memory by the sequence change data writing unit, and recompresses the read data.

According to a third aspect of the present invention, there is provided an image processing apparatus for spatially processing image data picked up and stored in a frame memory in an image processing unit, compressing the obtained image data in an image compression unit connected in series with the image processing unit, and outputting the obtained compressed image data, comprising:

a buffer memory which inputs the image data obtained from the image processing unit sequentially for one block line having pixels of N times of a minimum unit of the image compression in the direction of column, and the length in the direction of row equivalent to one length of a scanning line, and outputs sequentially the image data of each block by dividing the image data into a plurality of block, which consists of N unit blocks arranged in the direction of column, each of the unit blocks consisting of M minimum units of the image compression arranged in the direction of row;

a first image compression unit which obtains compressed image data for each block of one block line by compressing the image data of each block output sequentially from the buffer memory, sequentially from the upper side unit block of each block, and writes the obtained compressed image data for each block of one block line in the frame memory;

an image expansion unit which obtains expanded image data for each block of one block line by reading and expanding the compressed image data for each block of one block line written in the frame memory by the first image compression unit, and writes the obtained expanded image data for each block of one block line in the frame memory;

a sequence change data reading unit which reads the expanded image data for each block of one block line written in the frame memory by the image expansion unit from the frame memory, so that the sequence of the expanded image data is changed; and a second image compression unit which recompresses the expanded image data for each block of one block line read from the frame memory by the sequence change data reading unit.

According to a fourth aspect of the present invention, there is provided an image processing apparatus for spatially processing image data picked up and stored in a frame memory in an image processing unit, compressing the obtained image data in an image compression unit connected in series with the image processing unit, and outputting the obtained compressed image data, comprising:

a buffer memory which inputs the image data obtained from the image processing unit sequentially for one block line having pixels of N times of a minimum unit of the image compression in the direction of column, and the length in the direction of row equivalent to one length of a scanning line, and outputs sequentially the image data of each block by dividing the image data into a plurality of block, which consists of N unit blocks arranged in the direction of column, each of the unit blocks consisting of M minimum units of the image compression arranged in the direction of row;

a first image compression unit which obtains compressed image data for each block of one block line by compressing the image data output sequentially from the buffer memory, sequentially from the upper side unit block of each block, and writes the obtained compressed image data for each block of one block line in the frame memory; and a sequence change unit which changes the sequence of the compressed image data for each block of one block line written in the frame memory by the first image compression unit, wherein the sequence change unit includes an image expansion unit which obtains expanded image data for each block of one block line by reading and expanding the compressed image data for each block of one block line written in the frame memory by the first image compression unit;

an output unit which outputs only the expanded image data of the unit block corresponding to the Kth-order ($1 \leq K \leq N$) from the top of each block, among the expanded image data for each block of one block line obtained by the image expansion unit; and a second image compression unit which recompresses the expanded image data of the unit block corresponding to the Kth-order ($1 \leq K \leq N$) from the top of each block output from the output unit, wherein changing the sequence is performed by moving the position of the unit block of each block output from the output unit by 1 from the top, by repeating the operations of the image expansion unit, output unit and second image compression unit, by N times, and increasing the value of the K by 1 at each time of operation.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a diagram for writing data in a buffer memory in the first embodiment;

FIG. 3B is a diagram for reading data from a buffer memory in the first embodiment;

FIGS. 4A and 4B are views for explaining an unit block;

FIG. 7 is a diagram for explaining the sequence change of JPEG compressed data in the first embodiment;

FIG. 8A is a diagram showing the sequence of JPEG compressed data input finally to a frame memory in the first embodiment;

FIG. 8B is a conceptual illustration of JPEG compressed data written in a frame memory in the sequence of FIG. 8A;

FIG. 11A is a diagram showing the sequence of writing JPEG expanded data expanded in a JPEG expansion/compression unit in the second embodiment;

FIG. 11B is a conceptual illustration of JPEG expanded data written in a frame memory in the sequence of FIG. 11A;

FIG. 12 is a diagram for explaining the sequence change of JPEG compressed data in the second embodiment;

FIG. 13A is a diagram showing the sequence of JPEG compressed data input finally to a frame memory in the second embodiment;

FIG. 13B is a conceptual illustration of JPEG compressed data written in a frame memory in the sequence of FIG. 13A;

FIG. 17 is a diagram showing JPEG expansion in a JPEG expansion unit in the third embodiment;

FIG. 18 is a diagram for explaining the sequence change of JPEG compressed data in the third embodiment;

FIG. 19A is a diagram showing the sequence of JPEG compressed data input finally to a frame memory in the third embodiment;

FIG. 19B is a conceptual illustration of JPEG compressed data written in a frame memory in the sequence of FIG. 19A; and FIG. 20 is a diagram for explaining a restart marker.

DETAILED DESCRIPTION OF THE INVENTION

Embodiments of the present invention will be explained hereinafter with reference to the accompanying drawings.

FIRST EMBODIMENT

Figure 1:
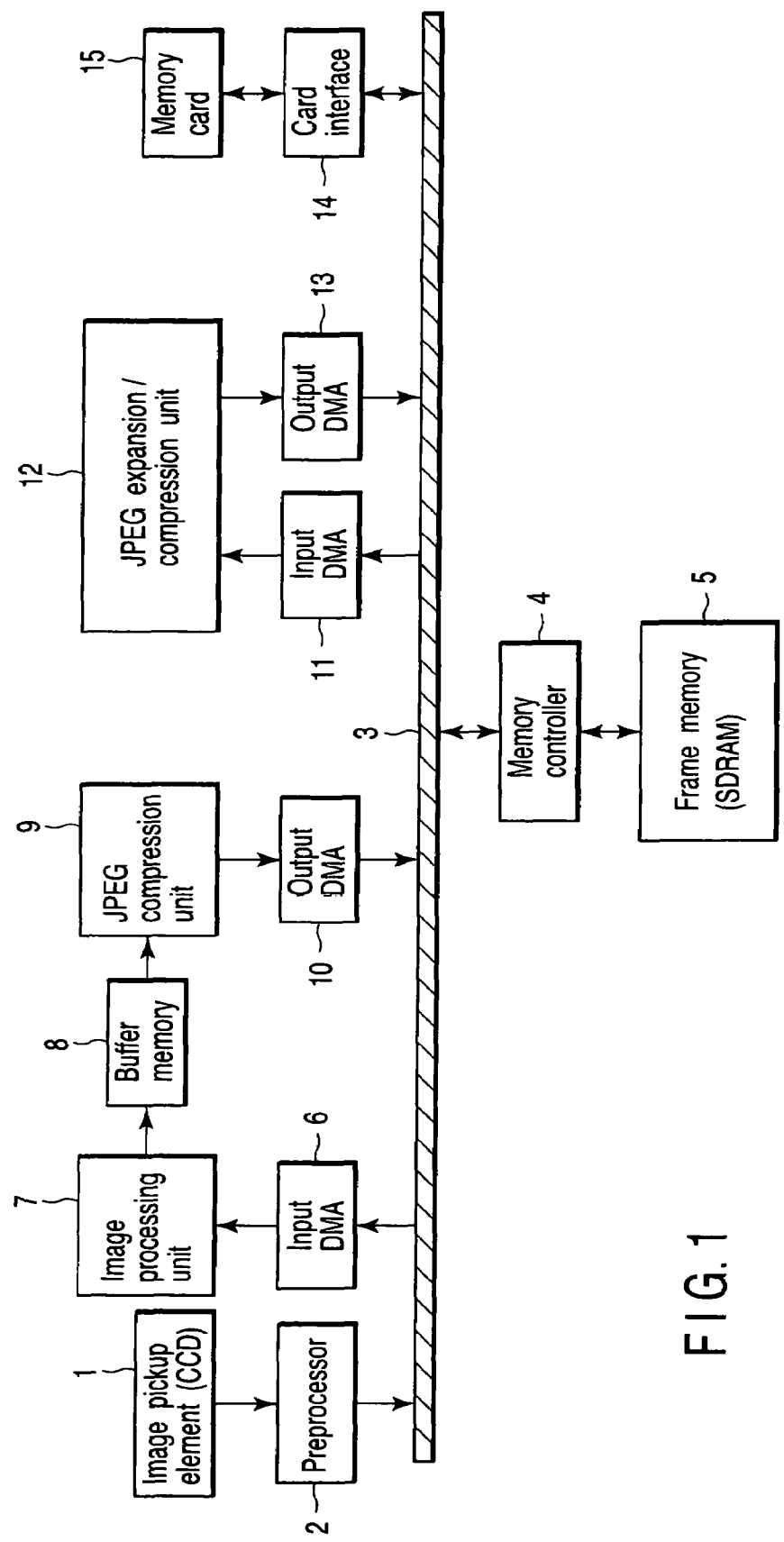
FIG. 1 is a block diagram of an image processing apparatus according to a first embodiment of the present invention, applied to a digital camera, for example.

FIG. 1 is a block diagram of an image processing apparatus according to a first embodiment of the present invention, applied to a digital camera, for example. A digital camera shown in FIG. 1 comprises an image pickup element 1, a preprocessor 2, a bus 3, a memory controller 4, a frame memory 5, an input DMA 6, an image processing unit 7, a buffer memory 8, a JPEG compression unit 9, an output DMA 10, an input DMA 11, a JPEG expansion/compression unit 12, an output DMA 13, a card interface 14, and a memory card 15.

In FIG. 1, an image pickup signal obtained in the image pickup element 1 consisting of CCD or the like is input to the preprocessor 2. The preprocessor 2 performs preprocessing of the input image pickup signal, such as analog amplification and digital conversion. Image data (RGB Bayer data for one frame) obtained in the preprocessor 2 is written in the frame memory 5 consisting of a volatile memory such as SDRAM through the bus 3 and memory controller 4.

The image data written in the frame memory 5 is read by the image processing unit 7 through the input DMA 6. In the first embodiment, assuming spatial image processing such as LPF and resizing, the image data necessary for compression in a subsequent stage added the image data (margin image data) deleted by the spatial image processing in the image processing unit 7 are read as image data for one block line. The image data for one block line has pixels in the direction of column of N times of a minimum unit (Minimum Coded Unit: MCU) of data compression, and has the length in the direction of row equivalent to one length of a scanning line. Further, in the first embodiment, JPEG compression is performed for each image data equivalent to a block consisting of N unit blocks arranged in the direction of column, each of which consists of M MCUs arranged in the direction of row.

Figure 2:
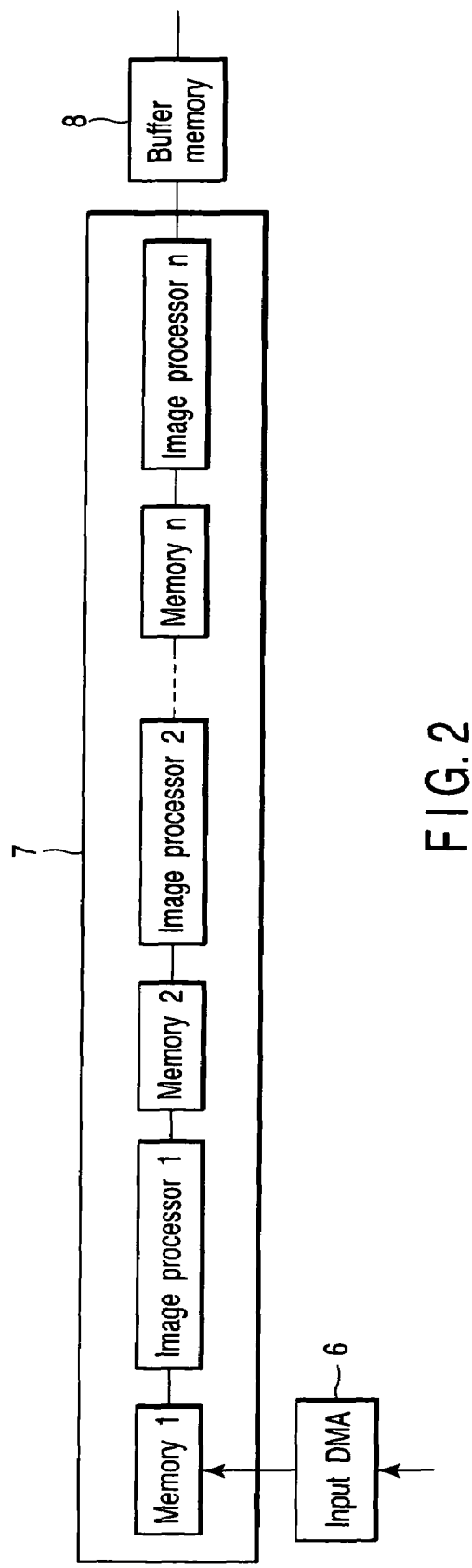
FIG. 2 is a diagram showing the configuration of an image processing unit.

The image processing unit 7 is composed of image processors connected in series, and a small capacity buffer memory provided among the image processors, as shown in FIG. 2. The image processing unit 7 generates YC data by performing a YC generating process for the input image data. The image processing unit 7 performs white balance correction and gradation correction, and further performs spatial image processing such as LPF and magnification/reduction, according to the image size at the time of recording. For the spatial image processing, the margin image data is deleted. Thus, only the image data corresponding to the block is sequentially written in the buffer memory 8.

The buffer memory 8 is composed of two buffer memories, for example. Each buffer memory has capacity of at least storing one image data corresponding to the block. By using the buffer memory 8 with such a structure, the image data processed in the image processing unit 7 is divided into blocks consisting of N unit blocks.

As for the two buffer memories composing the buffer memory 8, while the image data corresponding to one block shown in FIG. 3A is written in one of the buffer memory, one block shown in FIG. 3B is sequentially read from the other buffer memory, sequentially from the upper side unit block. The example of FIG. 3B shows that N is 4, that is, one block is composed of four unit blocks. The values of M and N may be other values.

The image data output from the image processing unit 7 is divided into blocks in the buffer memory 8, and each block is input from the upper side unit block to the JPEG compression unit 9 as a first image compression unit. The JPEG compression unit 9 performs loosy compression (here, JPEG compression) for each block sequentially from the upper side unit block, and sequentially writes the JPEG compressed data of the unit block of each block obtained by the compression in the frame memory 5 through the output DMA 10. As a result, the JPEG compressed data for one block line can be obtained.

Now, explanation will be give on the unit blocks forming the block. As described above, one unit block consists of M MCUs (M=4, for example). MCU is a unit block data for processing JPEG processing (JPEG compression and expansion), and usually has a size of 8×8 pixels or an integer multiple of this size. MCU is composed of Y, Cb and Cr data generated by the YC generation process. There are various methods of arranging these Y, Cb and Cr data on the frame memory 5. For example, there is a method of arranging Y, Cb and Cr forming one MCU on the frame memories in this sequence, according to the output sequence of JPEG processing, as shown in FIG. 4A. Or, Y, Cb and Cr forming one MCU may be arranged in different regions on the frame memory, as shown in FIG. 4B.

In the first embodiment, as the width of a block line in the direction of column is take large, the number of data allowed to output for the number of taps in the spatial image processing in the image processing unit 7 can be increased, and the image processing efficiency can be increased. All the data read for each block line can be input to the JPEG compression unit 9 for each unit block consisting of MCU.

Figure 5A:
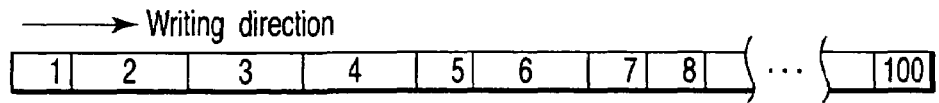
FIG. 5A is a diagram showing the sequence of writing JPEG compressed data compressed in a JPEG compression unit in the first embodiment.
Figure 5B:
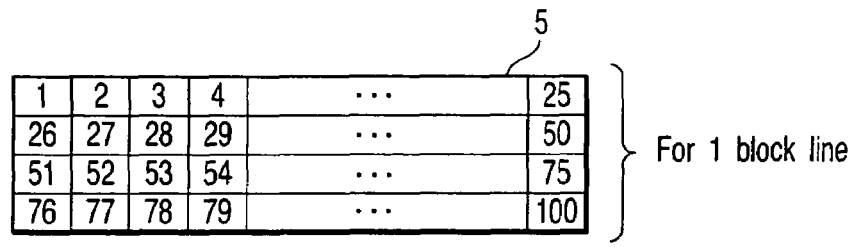
FIG. 5B is a conceptual illustration of JPEG compressed data written in a frame memory in the sequence of FIG. 5A.

FIG. 5A shows the sequence of writing the JPEG compressed data for one block line of each block compressed in the JPEG compression unit 9, in the frame memory 5 for each unit block through the output DMA 10. A unit block is sequentially read from the buffer memory 8 for each block by a raster scanning method, as shown in FIG. 3B. The JPEG compression unit 9 performs JPEG compression sequentially from the upper side unit block of the previously input blocks. Therefore, the JPEG compressed data for each block is written in the frame memory 5 in the sequence shown in FIG. 5B. This data sequence is changed from the sequence of image data before the JPEG compression, and if the data is recorded on a recording media in this sequence, the image will not be correctly reproduced when the data is played back.

In the first embodiment, JPEG compressed data changed in sequence is recorded after correcting the sequence. Therefore, the JPEG compressed data for one block line of each block compressed in the JPEG compression unit 9 and written in the frame memory 5 is read for each block through the input DMA 11 and input to the JPEG expansion/compression unit 12 as a second image compression unit.

Figure 5C:
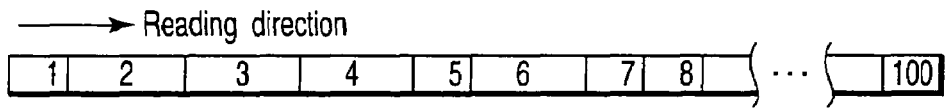
FIG. 5C is a diagram showing the sequence of reading JPEG compressed data from a frame memory.
Figure 6:
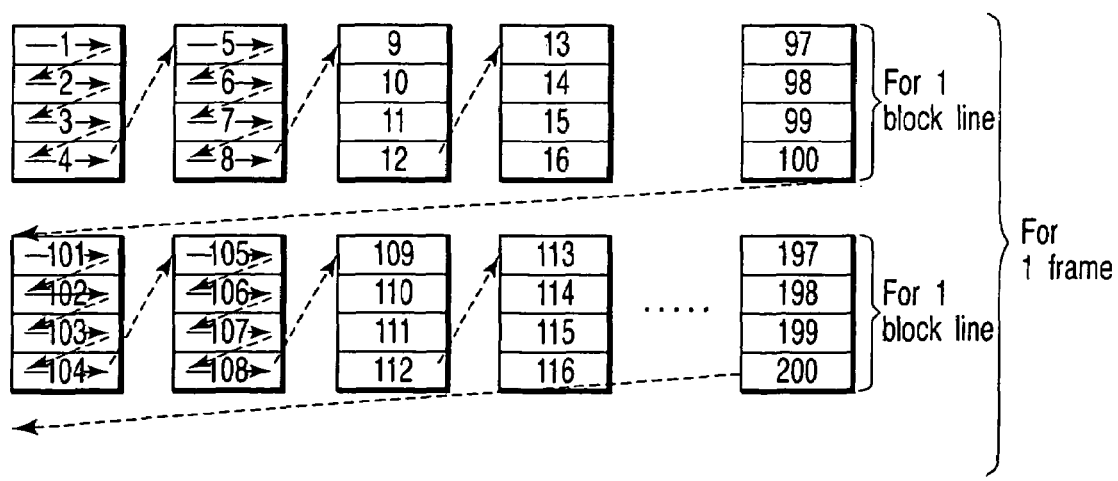
FIG. 6 is a diagram showing JPEG expansion in a JPEG expansion/compression unit in the first embodiment.

FIG. 5C shows the sequence of reading the JPEG compressed data for one block line of each block stored in the frame memory 5, from the frame memory 5 through the input DMA 11. The sequence of reading from the frame memory 5 shown in FIG. 5C is the same as the sequence of writing in the frame memory 5 shown in FIG. 5A. The JPEG expansion/compression unit 12 expands JPEG data for each unit block in the sequence of FIG. 5C. The obtained JPEG expanded data for one block line of each block is sequentially written in the frame memory 5 for each unit block in the sequence of FIG. 6 through the output DMA 13. The sequence of the obtained JPEG expanded data for one block line of each block is changed to the same sequence as shown in FIG. 3B.

Thereafter, the JPEG expanded data for one block line of each block stored in the frame memory 5 is read again through the input DMA 11, and input to the JPEG expansion/compression unit 12, and compressed again. In this time, the JPEG compressed data is read from the upper side unit block of each block in the image data as shown in FIG. 7, so that the JPEG data is compressed in the correct sequence. After the read unit block is submitted to the JPEG compression process, it is input to the frame memory 5 in the sequence shown in FIG. 8A. Thus, the JPEG compressed data for one block line of each block corrected in the sequence is written in the frame memory 5, shown in FIG. 8B.

A quantizing table used for recompression in the JPEG expansion/compression unit 12 is preferably the same as the table used for compression in the JPEG compression unit 9. This can suppress degradation of image quality by the recompression. The degradation of image quality caused by the JPEG recompression can be further suppressed by changing the quantizing table used for the JPEG recompression in the JPEG expansion/compression unit 12, based on the amount of code upon the JPEG compression in the JPEG compression unit 9.

Thereafter, as explained above, a series of operations, including image processing, JPEG compression, JPEG expansion, sequence change and JPEG recompression is repeated for one frame for each block line. Thus, the JPEG compressed data for one frame written in the frame memory 5 is added by predetermined header information, and finally transferred to and recorded in the memory card 15 as a recording medium through the card interface 14. Though the memory card is shown as a recording medium in FIG. 1, the recording medium is not limited to various types of semiconductor memory, such as Smart Media (registered trademark) card, Compact Flash (registered trademark) card, SD card and memory stick (registered trademark) card. A hard disc or an optical disc, such as an optical magnetic disc (MO) and DVD may also be used.

As explained above, according to the first embodiment, image data with the width of a block line in the direction of column increased is read, the number of data allowed to output for the number of taps in the image processing in the image processing unit 7 can be increased. Therefore, the image processing efficiency in the image processing unit 7 can be increased. Image data for each unit block consisting of MCU is input from the image processing unit 7 to the JPEG compression unit 9, and the total image processing efficiency when image data is input from the image processing unit 7 to the JPEG compression unit 9 can be increased.

The JPEG compressed data obtained by compression in the JPEG compression unit 9 is changed wrong in sequence when it is written in the frame memory 5. However, in the first embodiment, the JPEG compressed data written in the frame memory 5 is read and expanded, and the sequence of the obtained JPEG expanded data is changed to the sequence before the JPEG compression when writing in the frame memory 5, and then read the data in the sequence of raster scanning and recompressed. The sequence of the JPEG compressed data is corrected when the data is finally recorded in the memory card 15.

The above-described series of operations, such as JPEG expansion, sequence change and JPEG recompression is preferably synchronized with the transfer of JPEG compressed data to the memory card 15. Namely, at the completion of writing the JPEG compressed data obtained by JPEG recompression in the frame memory 5, or by transferring the JPEG compressed data from the frame memory 5 to the memory card 15 in parallel to the data writing by utilizing the slow transfer speed of the memory card 15, a bus traffic peak of the frame memory 5 can be prevented. As a result, the processing speed up to the JPEG compression can be increased.

In the above explanation, the sequence of JPEG compressed data is changed when the image data for one block line is compressed in the JPEG compression unit 9 and the data writing in the frame memory 5 is completed. But, the JPEG data sequence change is not limited to this. The sequence of JPEG data may be changed at the time when the image data for one frame is compressed in the JPEG compression unit 9 and the data writing in the frame memory 5 is completed.

SECOND EMBODIMENT

A second embodiment will be explained. The second embodiment is another example of the sequence change of JPEG compressed data. The configuration is the same as that explained in FIG. 1, and detailed description will be omitted.

Figure 9A:
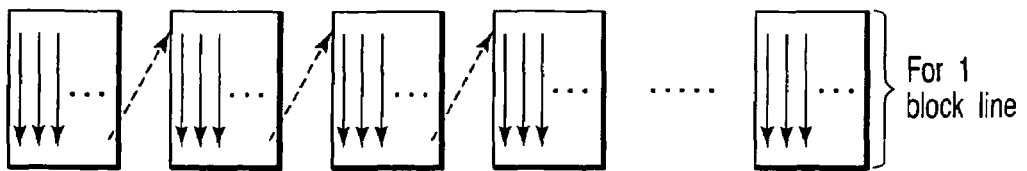
FIG. 9A is a diagram for writing data in a buffer memory in a second embodiment.
Figure 9B:
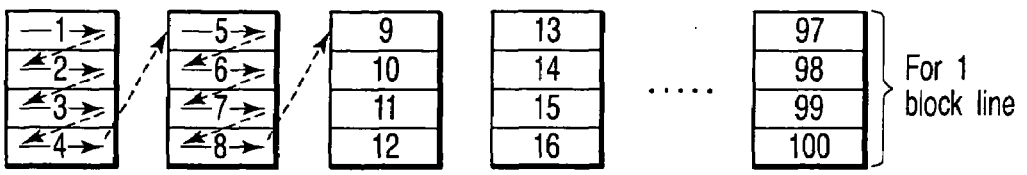
FIG. 9B is a diagram for reading data from a buffer memory in the second embodiment.
Figure 10A:
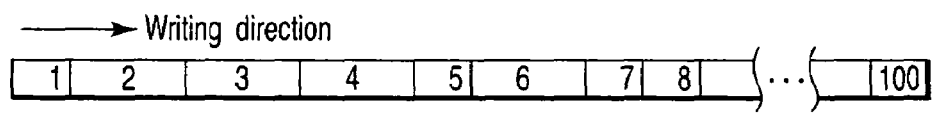
FIG. 10A is a diagram showing the sequence of writing JPEG compressed data compressed in a JPEG compression unit in the second embodiment.

The same parts as those of the first embodiment will be briefly explained. An image pickup signal input from the image pickup element 1 is converted to digital data through the preprocessor 2, and written in the frame memory 5 through the bus 3 and memory controller 4. The image data written in the frame memory 5 is read and processed for each block line by the image processing unit 7, as explained in the first embodiment. The data processed in the image processing unit 7 is written in the buffer memory 8 for each block as shown in FIG. 9A, and input to the JPEG compression unit 9 for each block as shown in FIG. 9B. The JPEG compression unit 9 compresses the input data sequentially from the upper side unit block of the input block, and inputs the obtained JPEG compressed data for one block line of each block to the frame memory 5 in the sequence shown in FIG. 10A. Thus, the JPEG compressed data is written in the frame memory 5 as shown in FIG. 10B.

Figure 10B:
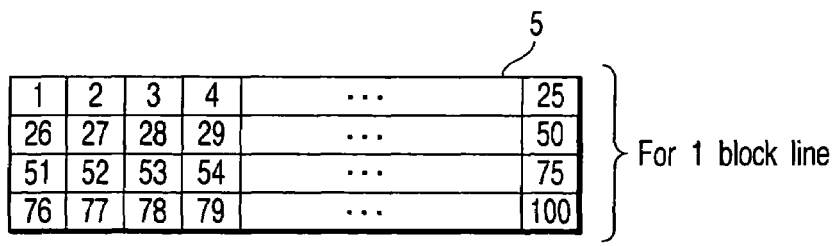
FIG. 10B is a conceptual illustration of JPEG compressed data written in a frame memory in the sequence of FIG. 10A.
Figure 10C:
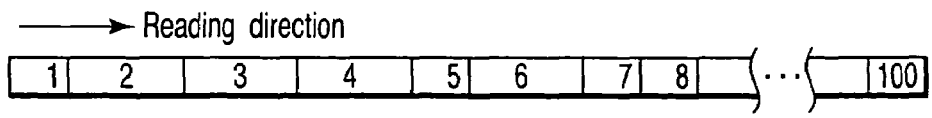
FIG. 10C is a diagram showing the sequence of reading JPEG compressed data from a frame memory.

The JPEG compressed data for one block line written in the frame memory 5 as shown in FIG. 10B is input to the JPEG expansion/compression unit 12 through the input DMA 11 in the sequence shown in FIG. 10C. The input JPEG compressed data is sequentially expanded, and input to the frame memory 5 through the output DMA 13 in the sequence shown in FIG. 11A. Thus, the JPEG expanded data for one block line of each block is written in the frame memory 5 as shown in FIG. 11B.

Then, the JPEG expanded data written in the frame memory 5 is read by changing the sequence as shown in FIG. 12, and input to the JPEG expansion/compression unit 12 through the input DMA 11, and compressed again. The obtained JPEG recompressed data is input to the frame memory 5 through the output DMA 13 in the sequence shown in FIG. 13A. Thus, the JPEG compressed data for one block line of each block with the sequence changed correctly is written in the frame memory 5.

The above-explained method of the second embodiment can increase the image processing efficiency in the image processing unit 7, and increase the total image processing efficiency when the image data is input to the JPEG compression unit 9. The sequence of the JPEG compressed data can be corrected when the data is finally recorded in the memory card 15.

In the second embodiment, a quantizing table used for recompression of JPEG data in the JPEG compression unit 24 is preferably the same as the table used for compression of JPEG data in the JPEG compression unit 9. It is also preferable to change the quantizing table based on the amount of code upon the JPEG compression in the JPEG compression unit 9.

In the second embodiment, as in the first embodiment, JPEG processing may be performed for one frame of image data.

THIRD EMBODIMENT

Figure 14:
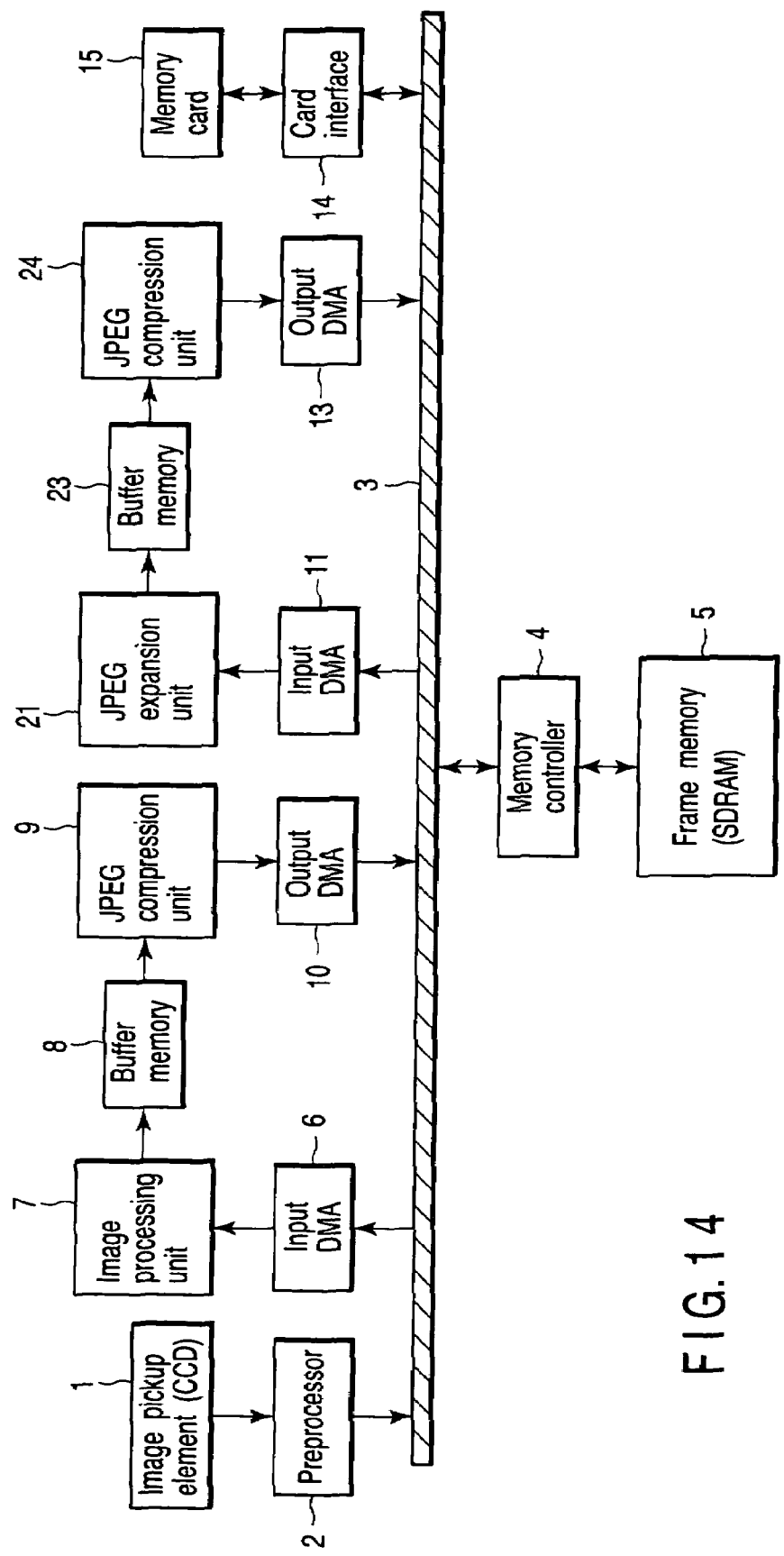
FIG. 14 is a block diagram of an image processing apparatus according to a third embodiment of the present invention, applied to a digital camera, for example.

A third embodiment will be explained. FIG. 14 is a block diagram of an image processing apparatus according to a third embodiment of the present invention, applied to a digital camera, for example. The difference of FIG. 14 from FIG. 1 is that a JPEG expansion unit 21, a buffer memory 23 and a JPEG compression unit 24 are provided instead of the JPEG expansion/compression unit 12.

Figure 15A:
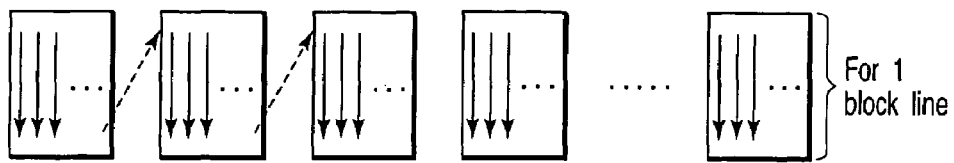
FIG. 15A is a diagram for writing data in a buffer memory in the third embodiment.
Figure 15B:
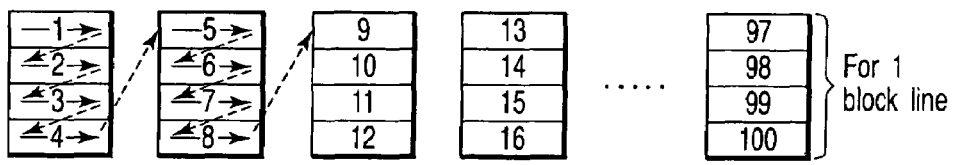
FIG. 15B is a diagram for reading data from a buffer memory in the third embodiment.
Figure 16A:
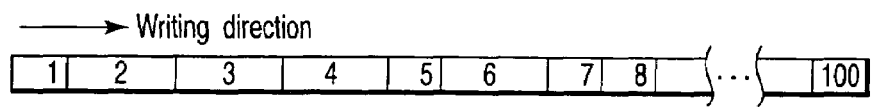
FIG. 16A is a diagram showing the sequence of writing JPEG compressed data compressed in a JPEG compression unit in the third embodiment.
Figure 16B:
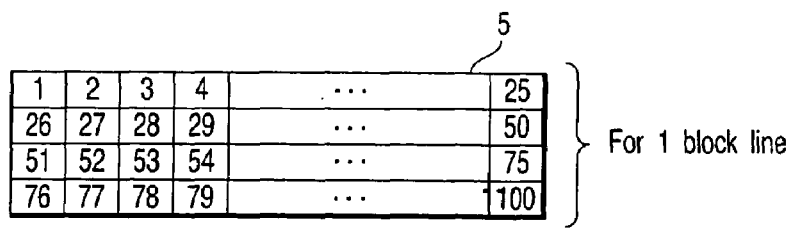
FIG. 16B is a conceptual illustration of JPEG compressed data written in a frame memory in the sequence of FIG. 16A.

The same parts as those of the first and second embodiments will be briefly explained. An image pickup signal input from the image pickup element 1 is converted to digital data through the preprocessor 2, and written in the frame memory 5 through the bus 3 and memory controller 4. The image data written in the frame memory 5 is read and processed for each block line by the image processing unit 7. The data processed in the image processing unit 7 is written in the buffer memory 8 for each block as shown in FIG. 15A, and input to the JPEG compression unit 9 for each block as shown in FIG. 15B. The JPEG compression unit 9 compresses the input data sequentially from the upper side unit block of the input block, and inputs the obtained JPEG compressed data for one block line of each block to the frame memory 5 as shown in FIG. 16A. Thus, the JPEG compressed data is written in the frame memory 5 as shown in FIG. 16B.

Figure 16C:
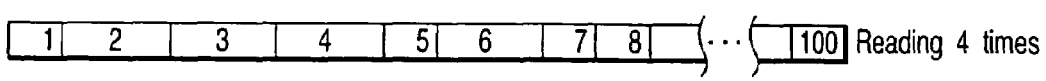
FIG. 16C is a diagram showing the sequence of reading JPEG compressed data from a frame memory.

The following sequence change of JPEG compressed data is different from the first and second embodiments. The JPEG compressed data for one block line written in the frame memory 5 as shown in FIG. 16B is read by N times (4 times in the example) in the sequence shown in FIG. 16C, and input to the JPEG expansion unit 21 through the input DMA 11. The JPEG expansion unit 21 expands the input JPEG data for one block line for 4 times, as shown in FIG. 17. Then, the obtained JPEG expanded data for each block is input in the buffer memory 23.

The buffer memory 23 outputs only the unit block of the Kth-order ($1 \leq K \leq N$) from the top of the input blocks to the JPEG compression unit 24, as sequence change data, and discards the other unit blocks. The unit block input to the JPEG compression unit 24 is recompressed and written in the frame memory 5 through the output DMA 13.

The value of the K is determined according to the sequence of inputting JPEG expanded data for each block. In the example, K=1 when the JPEG expanded data is input for the first time. Only the JPEG expanded data of the first unit block from the top of each block (1, 5, 9, 13, ..., 97 in the example) is output to and compressed in the JPEG compression unit 24. Similarly, for the JPEG expanded data input at the second time, only the JPEG expanded data of the second unit block from the top of each block (2, 6, 10, 14, ..., 98 in the example) is output to and compressed in the JPEG compression unit 24. As for the JPEG expanded data input at the third time, only the JPEG expanded data of the third unit block from the top of each block (3, 7, 11, 15, ..., 99 in the example) is output to and compressed in the JPEG compression unit 24. For the JPEG expanded data input at the fourth time, only the JPEG expanded data of the fourth unit block from the top of each block (4, 8, 12, 16, ..., 100 in the example) is output to and compressed in the JPEG compression unit 24. The JPEG compressed unit block data is input to the frame memory 5 through the output DMA 13 in the sequence shown in FIG. 19A. By the above operations, the sequence of the JPEG compressed data for one block line after being written in the frame memory 5 is finally changed as shown in FIG. 19B, and the JPEG compressed data with the correct sequence can be obtained.

A quantizing table used for recompression of JPEG data in the JPEG compression unit 24 is preferably the same as the table used for compression of JPEG data in the JPEG compression unit 9, as in the first embodiment. It is also preferable to change the quantizing table based on the amount of code upon the JPEG compression in the JPEG compression unit 9.

Thereafter, as explained above, a series of operations including image processing, JPEG compression, JPEG expansion, sequence change and JPEG recompression is repeated for one frame for each block line. Thus, the JPEG compressed data for one frame written in the frame memory 5 is finally transferred to and recorded in a memory card 15 as a recording medium through the card interface 14. As in the first embodiment, when recording JPEG compressed data in the memory card 15, the JPEG compressed data may be directly recorded in the memory card 15 without writing in the frame memory 5.

As explained above, according to the third embodiment, JPEG expansion and recompression can be performed as a directly connected process, and a bus traffic for reading and writing uncompressed JPEG expanded data in/from the frame memory 5 can be eliminated, in addition to the effect explained in the first embodiment. The processing speed can be increased by this.

Next, explanation will be given on a method for recognizing a break in the JPEG compressed data for one block line written in the frame memory 5, and setting a first address of the JPEG compressed data for a block line to be changed in sequence next.

In a first method for recognizing a break in one block line, marker data called a restart marker is inserted at each time of JPEG compression of one MCU×M blocks (unit block) in the JPEG compression unit 9, as shown in FIG. 20, and the number of restart markers is counted in the output DMA 10, whereby the address of a break in a block line is detected and stored. Based on the stored address, a first address of JPEG compressed data for a block line to be changed in sequence next is set. For example, in the example of FIG. 20, the writing of the JPEG compressed data for one block line in the frame memory 5 is detected at the time when 100 restart markers are counted. Thus, by storing the address of this time, the JPEG compressed data for one block line can be read from the frame memory 5, and changed in the sequence.

In a second method for recognizing a break in one block line, the address of a break in a block line is detected and stored by counting the number of restart markers when reading JPEG compressed data from the frame memory 5 through the input DMA 11. Based on the stored address, a first address of JPEG compressed data for a block line to be changed in sequence next is set.

A third method for recognizing a break in one block line is a method of finishing compression whenever compression of one block line is completed. In this method, one block line is assumed as one image data, and whenever JPEG compression for one block line is performed, the obtained JPEG compressed data is recorded in the memory card 15. A first address of each JPEG compressed data is stored simultaneously. Based on the stored address, a fist address of JPEG compressed data for a block line to be changed in sequence next is set. In the third method, a JPEG file is created whenever JPEG compression is performed for each one block line.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method for spatially processing image data picked up and stored in a frame memory in an image processing unit of a digital camera, compressing the obtained image data in an image compression unit connected in series with the image processing unit, and outputting the obtained compressed image data, comprising:

inputting, with a buffer memory of the digital camera, the image data obtained from the image processing unit of the digital camera sequentially for one block line having pixels of N times of a minimum unit of the image compression in the direction of column, and the length in the direction of row equivalent to one length of a scanning line, and outputting sequentially the image data of each block by dividing the image data into a plurality of blocks, which consists of N unit blocks arranged in the direction of column, each of the unit blocks consisting of M minimum units of the image compression arranged in the direction of row;

compressing, with the image compression unit of the digital camera, the sequentially output image data of each block sequentially from the upper side unit block of each block, and obtaining compressed image data for each block of one block line;

writing, with an image expansion of the digital camera, the obtained compressed image data for each block of one block line in the frame memory of the digital camera; and changing, with a sequence change data writing unit of the digital camera, the sequence of the written compressed image data for each block of one block line.

2. The image processing method according to claim 1, wherein compressing the image data is lossy image compressing.

3. The image processing method according to claim 2, wherein the lossy image compressing includes JPEG compression.

4. The image processing method according to claim 1, wherein the minimum unit of the image compression consists of one Minimum Coded Unit (MCU).

5. The image processing method according to claim 1, wherein the frame memory includes a volatile memory.

6. The image processing method according to claim 1, further comprising obtaining compressed image data for one frame of the image data, by repeating obtaining the compressed image data, writing the compressed image data in the frame memory, reading the compressed image data in the frame memory, and changing the sequence of the compressed image data for each one block line of the image data.

7. The image processing method according to claim 1, further comprising obtaining compressed image data for one frame of the image data, by repeating changing the sequence of the compressed image data for one frame of the image data obtained by repeating obtaining the compressed image data and writing the compressed image data in the frame memory for each one block line of the image data.

8. The image processing method according to claim 1, wherein changing the sequence of the compressed image data includes:

reading the compressed image data for each block of one block line written in the frame memory;

obtaining expanded data for each block of one block line by expanding the read compressed image data for each block of one block line;

outputting only the expanded image data of the unit block corresponding to the Kth-order ($1 \leq K \leq N$) from the top of each block, among the obtained expanded image data for each block of one block line;

recompressing the expanded image data for the unit block corresponding to the Kth-order ($1 \leq K \leq N$) from the top of the each output block; and moving the position of the output unit block by 1 from the top, by repeating reading the compressed image data, obtaining the expanded image data, outputting the expanded image data, and recompressing the image data by N times, and increasing the value of the K by 1 at each time of repetition.

9. The image processing method according to claim 1, wherein changing the sequence of the compressed image data includes:

obtaining expanded image data for each block of one block line by reading the compressed image data for each block of one block line written in the frame memory, and expanding the read compressed image data;

writing the obtained expanded image data for each block of one block line in the frame memory, so that the sequence of the expanded image data is changed; and recompressing the expanded image data for each block of one block line written in the frame memory after the sequence is changed.

10. The image processing method according to claim 1, wherein changing the sequence of the compressed image data includes:

obtaining expanded image data for each block of one block line by reading the compressed image data for each block of one block line written in the frame memory and expanding the read compressed image data, and writing the obtained expanded image data for each block of one block line in the frame memory;

reading the obtained expanded image data for each block of one block line written in the frame memory, so that the sequence of the expanded image data is changed; and recompressing the expanded image data for each block of one block line read after the sequence is changed.

11. The image processing method according to claim 1, further comprising:

transferring the compressed image data with the sequence changed for writing in the frame memory; and reading the compressed image data transferred and written in the frame memory, and transferring the compressed image data for writing in a recording medium, wherein changing the sequence is executed, so that the speed of transferring the compressed image data to the frame memory becomes substantially the same as the speed of transferring the compressed image data to the recording medium.

12. The image processing method according to claim 8, further comprising:

transferring the compressed image data with the sequence changed for writing in the frame memory and reading the compressed image data transferred and written in the frame memory, and transferring the compressed image data for writing in a recording medium, wherein changing the sequence is executed, so that the speed of transferring the compressed image data to the frame memory becomes substantially the same as the speed of transferring the compressed image data to the recording medium.

13. The image processing method according to claim 9, further comprising:

transferring the compressed image data with the sequence changed for writing in the frame memory and reading the compressed image data transferred and written in the frame memory, and transferring the compressed image data for writing in a recording medium, wherein changing the sequence is executed, so that the speed of transferring the compressed image data to the frame memory becomes substantially the same as the speed of transferring the compressed image data to the recording medium.

14. The image processing method according to claim 10, further comprising:

transferring the compressed image data with the sequence changed for writing in the frame memory, and reading the compressed image data transferred and written in the frame memory, and transferring the compressed image data for writing in a recording medium, wherein changing the sequence is executed, so that the speed of transferring the compressed image data to the frame memory becomes substantially the same as the speed of transferring the compressed image data to the recording medium.

15. The image processing method according to claim 1, further comprising:

reading the compressed image data changed in the sequence and written in the frame memory, and transferring the compressed image data for writing in the recording medium, wherein changing the sequence is executed according to the speed of transferring the compressed image data to the recording medium.

16. The image processing method according to claim 8, further comprising:

reading the compressed image data changed in the sequence and written in the frame memory, and transferring the compressed image data for writing in the recording medium, wherein changing the sequence is executed according to the speed of transferring the compressed image data to the recording medium.

17. The image processing method according to claim 9, further comprising:

reading the compressed image data changed in the sequence and written in the frame memory, and transferring the compressed image data for writing in the recording medium, wherein changing the sequence is executed according to the speed of transferring the compressed image data to the recording medium.

18. The image processing method according to claim 10, further comprising:

reading the compressed image data changed in the sequence and written in the frame memory, and transferring the compressed image data for writing in the recording medium, wherein changing the sequence is executed according to the speed of transferring the compressed image data to the recording medium.

19. The image processing method according to claim 11, wherein the recording medium includes at least one of a semiconductor memory, a hard disc, an optical magnetic disc, and an optical disc.

20. The image processing method according to claim 15, wherein the recording medium includes at least one of a semiconductor memory, a hard disc, an optical magnetic disc, and an optical disc.

21. The image processing method according to claim 1, wherein obtaining the compressed image data includes:

inserting a restart marker for a unit block whenever the image data of the unit block is compressed;

counting the number of the restart marker when writing the compressed image data in the frame memory, and detecting an address when writing the compressed image data for one block line of the blocks in the frame memory is completed, based on the counted number;

storing the detected address; and setting a first address of compressed image data for one block line to be changed in sequence next, based on the stored address.

22. The image processing method according to claim 8, wherein obtaining the compressed image data includes:

inserting a restart marker for a unit block whenever the image of the unit block is compressed;

counting the restart marker when writing the compressed image data in the frame memory, and detecting an address used when writing the compressed image data for only one block line of the blocks in the frame memory;

storing the detected address; and setting a first address of compressed image data for a block line to be changed in sequence next, based on the stored address.

23. The image processing method according to claim 9, wherein obtaining the compressed image data includes:

inserting a restart marker for a unit block whenever compressing the image for a unit block is performed;

counting the restart marker when writing the compressed image data in the frame memory, and detecting an address used when writing the compressed image data for only one block line of blocks in the frame memory;

storing the detected address; and setting a first address of compressed image data for a block line to be changed in sequence next, based on the stored address.

24. The image processing method according to claim 10, wherein obtaining the compressed image data includes:

inserting a restart marker for a unit block whenever the image of the unit block is compressed;

counting the restart marker when writing the compressed image data in the frame memory, and detecting an address used when writing the compressed image data for only one block line of the blocks in the frame memory;

storing the detected address; and setting a first address of compressed image data for a block line to be changed in sequence next, based on the stored address.

25. The image processing method according to claim 8, wherein obtaining the compressed image data includes inserting a restart marker for a unit block whenever the image data of the unit block is compressed; and changing the sequence of the compressed image data includes:

counting the number of the restart marker when reading the compressed image data for each block of one block line, and detecting an address when reading the compressed image data for one block line of the blocks in the frame memory is completed, based on the counted number;

storing the detected address; and setting a first address of compressed image data for one block line to be changed in sequence next, based on the stored address.

26. The image processing method according to claim 1, wherein obtaining the compressed image data includes finishing the compressing process whenever the image data is compressed for one block line of the blocks, detecting and storing an address obtained by compressing the image data for one block line, and setting a first address of compressed image data for a block line to be changed in sequence next, based on the stored address.

27. An image processing apparatus for spatially processing image data picked up and stored in a frame memory in an image processing unit, compressing the obtained image data in an image compression unit connected in series with the image processing unit, and outputting the obtained compressed image data, comprising:

a buffer memory which inputs the image data obtained from the image processing unit sequentially for one block line having pixels of N times of a minimum unit of the image compression in the direction of column, and the length in the direction of row equivalent to one length of a scanning line, and outputs sequentially the image data of each block by dividing the image data into a plurality of blocks, which consists of N unit blocks arranged in the direction of column, each of the unit blocks consisting of M minimum units of the image compression arranged in the direction of row;

a first image compression unit which obtains compressed image data for each block of one block line by compressing the image data of each block output sequentially from the buffer memory, sequentially from the upper side unit block of each block, and writes the obtained compressed image data for each block of one block line in the frame memory;

an image expansion unit which obtains expanded image data for each block of one block line by reading and expanding the compressed image data for each block of one block line written in the frame memory by the first image compression unit, and writes the obtained expanded image data for each block of one block line in the frame memory;

a sequence change data writing unit which writes the expanded image data for each block of one block line obtained in the image expansion unit, in the frame memory, so that the sequence of the expanded image data is changed; and a second image compression unit which reads the expanded image data for each block of one block line written in the frame memory by the sequence change data writing unit, and recompresses the read data.

28. The image processing apparatus according to claim 27, wherein the first and second image compression units perform lossy image compression.

29. The image processing apparatus according to claim 28, wherein the lossy image compression includes JPEG compression.

30. The image processing apparatus according to claim 27, wherein the minimum unit of the image compression consists of one Minimum Coded unit (MCU).

31. The image processing apparatus according to claim 27, wherein the frame memory includes a volatile memory.

32. An image processing apparatus for spatially processing image data picked up and stored in a frame memory in an image processing unit, compressing the obtained image data in an image compression unit connected in series with the image processing unit, and outputting the obtained compressed image data, comprising:

a buffer memory which inputs the image data obtained from the image processing unit sequentially for one block line having pixels of N times of a minimum unit of the image compression in the direction of column, and the length in the direction of row equivalent to one length of a scanning line, and outputs sequentially the image data of each block by dividing the image data into a plurality of blocks, which consists of N unit blocks arranged in the direction of column, each of the unit blocks consisting of M minimum units of the image compression arranged in the direction of row;

a first image compression unit which obtains compressed image data for each block of one block line by compressing the image data of each block output sequentially from the buffer memory, sequentially from the upper side unit block of each block, and writes the obtained compressed image data for each block of one block line in the frame memory;

an image expansion unit which obtains expanded image data for each block of one block line by reading and expanding the compressed image data for each block of one block line written in the frame memory by the first image compression unit, and writes the obtained expanded image data for each block of one block line in the frame memory;

a sequence change data reading unit which reads the expanded image data for each block of one block line written in the frame memory by the image expansion unit from the frame memory, so that the sequence of the expanded image data is changed; and a second image compression unit which recompresses the expanded image data for each block of one block line read from the frame memory by the sequence change data reading unit.

33. The image processing apparatus according to claim 32, wherein the first and second image compression units perform lossy image compression.

34. The image processing apparatus according to claim 33, wherein the lossy image compression includes JPEG compression.

35. The image processing apparatus according to claim 32, wherein the minimum unit of the image compression consists of one Minimum Coded unit (MCU).

36. The image processing apparatus according to claim 32, wherein the frame memory includes a volatile memory.

37. An image processing apparatus for spatially processing image data picked up and stored in a frame memory in an image processing unit, compressing the obtained image data in an image compression unit connected in series with the image processing unit, and outputting the obtained compressed image data, comprising:

- a buffer memory which inputs the image data obtained from the image processing unit sequentially for one block line having pixels of N times of a minimum unit of the image compression in the direction of column, and the length in the direction of row equivalent to one length of a scanning line, and outputs sequentially the image data of each block by dividing the image data into a plurality of blocks, which consists of N unit blocks arranged in the direction of column, each of the unit blocks consisting of M minimum units of the image compression arranged in the direction of row;
- a first image compression unit which obtains compressed image data for each block of one block line by compressing the image data output sequentially from the buffer memory, sequentially from the upper side unit block of each block, and writes the obtained compressed image data for each block of one block line in the frame memory; and
- a sequence change unit which changes the sequence of the compressed image data for each block of one block line written in the frame memory by the first image compression unit, wherein the sequence change unit includes an image expansion unit which obtains expanded image data for each block of one block line by reading and expanding the compressed image data for each block of one block line written in the frame memory by the first image compression unit;
- an output unit which outputs only the expanded image data of the unit block corresponding to the Kth-order ($1 \leq K \leq N$) from the top of each block, among the expanded image data for each block of one block line obtained by the image expansion unit; and
- a second image compression unit which recompresses the expanded image data of the unit block corresponding to the Kth-order ($1 \leq K \leq N$) from the top of each block output from the output unit,
- wherein changing the sequence is performed by moving the position of the unit block of each block output from the output unit by 1 from the top, by repeating the operations of the image expansion unit, output unit and second image compression unit, by N times, and increasing the value of the K by 1 at each time of operation.

38. The image processing apparatus according to claim 37, wherein the first and second image compression units perform lossy image compression.

39. The image processing apparatus according to claim 38, wherein the lossy image compression includes JPEG compression.

40. The image processing apparatus according to claim 37, wherein the minimum unit of the image compression consists of one Minimum Coded unit (MCU).

41. The image processing apparatus according to claim 37, wherein the frame memory includes a volatile memory.

* * * * *